(12) United States Patent
Hodges et al.

(10) Patent No.: US 10,917,483 B2
(45) Date of Patent: Feb. 9, 2021

(54) AUTOMATED COMMUNICATION-BASED INTELLIGENCE ENGINE

(71) Applicant: Numberai, Inc., Oakland, CA (US)

(72) Inventors: Daniel Hodges, Oakland, CA (US);
Tasos Roumeliotis, Moraga, CA (US);
Joel Grossman, Lafayette, CA (US);
Andrew Ruff, Berkeley, CA (US);
Steven Ginn, Lafayette, CA (US);
Andrew Smith, Oakland, CA (US)

(73) Assignee: NumberAI, Inc., Oakland, CA (US)

( * ) Notice: Subject to any disclaimer, the term of this patent is extended or adjusted under 35 U.S.C. 154(b) by 46 days.

(21) Appl. No.: 16/015,935

(22) Filed: Jun. 22, 2018

(65) Prior Publication Data
US 2018/0375947 A1 Dec. 27, 2018

Related U.S. Application Data

(60) Provisional application No. 62/523,475, filed on Jun. 22, 2017, provisional application No. 62/523,419, filed on Jun. 22, 2017, provisional application No. 62/523,452, filed on Jun. 22, 2017, provisional application No. 62/523,463, filed on Jun. 22, 2017, provisional application No. 62/523,490, filed on Jun. 22, 2017, provisional application No. 62/523,507, filed on Jun. 22, 2017.

(51) Int. Cl.
| | |
|---|---|
| *H04L 29/08* | (2006.01) |
| *H04L 12/58* | (2006.01) |
| *G06Q 30/02* | (2012.01) |
| *H04W 4/21* | (2018.01) |

(52) U.S. Cl.
CPC ............ *H04L 67/22* (2013.01); *G06Q 30/02* (2013.01); *G06Q 30/0201* (2013.01); *H04L 51/02* (2013.01); *H04L 51/32* (2013.01); *H04L 51/36* (2013.01); *H04L 67/10* (2013.01); *H04W 4/21* (2018.02)

(58) Field of Classification Search
CPC ............................... H04L 51/02; H04L 67/22
See application file for complete search history.

(56) References Cited

U.S. PATENT DOCUMENTS

| | | | |
|---|---|---|---|
| 8,938,058 B2 * | 1/2015 | Soundar ................ | H04M 3/523 379/211.02 |
| 9,272,616 B2 * | 3/2016 | Breuer ................... | B60K 15/04 |

(Continued)

*Primary Examiner* — Lashonda T Jacobs
(74) *Attorney, Agent, or Firm* — Dovas Law, P.C.

(57) ABSTRACT

A system that creates and automatically builds one or more entity models that are derived from communication-based information received over a network. Building the entity models uses machine learning, a user interface, a sentiment analyzer, a communication monitoring agent and an automated bot. Bots are created based on a bot template. New communication-based information is analyzed and processed to improve the entity model, to keep the bot up-to-date, and to update other services and products that the entity relies on. The system enables a business to cluster other entities together to assist in identifying competitors. The system provides analytical information about how users journey through an entity model. The system automatically maintains listings such as frequently asked questions. The system works in a networked environment, which may be a distributed network.

23 Claims, 9 Drawing Sheets

(56) References Cited

U.S. PATENT DOCUMENTS

| | | | | |
|---|---|---|---|---|
| 10,038,787 B2* | 7/2018 | Tamblyn | | H04M 3/42068 |
| 10,083,451 B2* | 9/2018 | Sehrawat | | G06F 21/31 |
| 10,467,655 B1* | 11/2019 | Feldman | | G06Q 30/0201 |
| 10,489,817 B2* | 11/2019 | Perkins | | G06Q 30/0242 |
| 10,497,004 B2* | 12/2019 | Shaev | | G06F 40/284 |
| 10,664,885 B2* | 5/2020 | Lee | | G06Q 30/0643 |
| 10,733,614 B2* | 8/2020 | Sapoznik | | G06F 40/35 |
| 10,757,195 B2* | 8/2020 | Rojvongpaisal | | H04L 67/141 |
| 2009/0248479 A1* | 10/2009 | Johnson | | G06Q 30/0635 |
| | | | | 705/16 |
| 2010/0325107 A1* | 12/2010 | Kenton | | G06Q 30/00 |
| | | | | 707/723 |
| 2011/0078105 A1* | 3/2011 | Wallace | | G06Q 30/02 |
| | | | | 706/47 |
| 2012/0221411 A1* | 8/2012 | Graham, Jr. | | G06Q 30/02 |
| | | | | 705/14.52 |
| 2013/0191481 A1* | 7/2013 | Prevost | | H04L 51/14 |
| | | | | 709/206 |
| 2013/0326378 A1* | 12/2013 | Okubo | | G06F 3/0484 |
| | | | | 715/763 |
| 2015/0310377 A1* | 10/2015 | Schlumberger | | |
| | | | | G06Q 10/063114 |
| | | | | 705/7.15 |
| 2016/0071134 A1* | 3/2016 | Duncan | | G06Q 30/0202 |
| | | | | 705/7.33 |
| 2017/0048170 A1* | 2/2017 | Smullen | | H04L 67/02 |
| 2017/0235724 A1* | 8/2017 | Grewal | | G06F 40/56 |
| | | | | 704/9 |
| 2018/0018714 A1* | 1/2018 | Uhalley | | G06Q 30/0248 |
| 2018/0137295 A1* | 5/2018 | Sharma | | G06F 21/606 |
| 2018/0150749 A1* | 5/2018 | Wu | | G06F 16/9535 |
| 2018/0212904 A1* | 7/2018 | Smullen | | H04L 63/18 |
| 2018/0218252 A1* | 8/2018 | Wu | | G06N 3/006 |
| 2018/0218286 A1* | 8/2018 | Predovic | | G06F 16/95 |
| 2018/0232741 A1* | 8/2018 | Jadhav | | G06Q 30/016 |
| 2018/0285413 A1* | 10/2018 | Vora | | G06N 5/041 |
| 2018/0300748 A1* | 10/2018 | Flaks | | G06Q 30/0243 |
| 2019/0050731 A1* | 2/2019 | Lu | | G06F 16/353 |
| 2020/0126118 A1* | 4/2020 | Yang | | G06Q 30/0254 |

* cited by examiner

AUTOMATED COMMUNICATION-BASED INTELLIGENCE ENGINE

CROSS REFERENCE TO RELATED APPLICATIONS

This application claims the benefit of U.S. provisional application Nos. 62/523,419, 62/523,475, 62/523,452, 62/523,463, 62/523,490, and 62/523,507, each filed Jun. 22, 2017, and each incorporated by reference as if fully set forth.

FIELD OF THE INVENTION

The disclosed subject matter is directed to systems that use intelligence engines to automatically analyze and process communication-based information within a networked environment to create, maintain and operate an entity model.

BACKGROUND

Modern businesses and other entities often depend upon up-to-date communication-based information that is between their users and themselves over a wide variety of communication channels. Examples of communication-based information include phone numbers, addresses, IP addresses, hours of operation, identification of key personnel, capabilities, documents and directories, just to name a few. Other examples of communication-based information are centric to a particular party and may include costs, sales and marketing information, customer relationships, management issues, competitors, competitor's actions, customers, partners, taxes, local search algorithms, and local concerns such as government regulations and transportation infrastructures.

Modern entities face major problems with trying to keep their communication-based information up-to-date and accurate. Incorrect or outdated information can easily drive customers or users away while enabling competitors to become more effective. Long gone are the days when a business entity only had to worry about local competitors. Today, global business entities that couple the power of the Internet with products backed by dedicated suppliers and delivered by ubiquitous delivery companies are major competitors. Such global business entities understand how necessary accurate communication-based information is in the decision-making process of customers.

The failure of legacy communication-based information sources such as telephone directories to supply up-to-date and complete information when coupled with the enormous amount of data that is readily available in modern society results in large gaps in an entity's communication-based information. Given that a potential customer or user has ready access to communication-based information over the Internet via their computer, laptop, tablet, or smart phone, if a business or other entity is not willing to properly service such potential customers or users those businesses can be assured that their competitors will.

As an example of the challenges of keeping communication-based information accessible and up-to-date consider Frequently Asked Questions ("FAQs"). Many entities publish FAQs along with corresponding answers on their websites. Easily accessible, FAQs are useful for website visitors (e.g., existing or potential customers, users or partners) who have a question that may be answered by the FAQs.

FAQs do far more than just provide answers. They represent part of the entity and provide facts about the entity, who its customers and partners are, the uses made of the entity's products, what matters to the entity, how the entity addresses the needs of its customers and partners, and the entity's tone, personality, and style. More than one company is likely now defunct for not properly handing FAQs.

In the prior art FAQs took significant effort in identifying and answering even common questions. The prior art usually relied on human judgment as to what questions should appear and what answers should be given. If that judgment was faulty it may not become apparent until too late. There was just no way to automate the creation of FAQs or other entity communications.

In addition, FAQs often grow stale almost as soon as they are published. For example, the information in the answers might not remain accurate, customers or other users may start asking questions that are not addressed in the old FAQs, competitors may be making inroads using communication-based information, and market considerations may change such as hours of operation, ownership, locations, phone numbers and many other factors. In the prior art there was just no way to automate updating FAQs or to analyze entity communication-based information to identify information gaps in FAQs or even to automate the delivery of communication-based information based on an analysis of prior communications. FAQs illustrate just one of the challenges of building and maintaining accurate and up to date communication-based information.

Proper handling of customer communications enables unique and little tapped opportunities for an entity to better understand the impact of its communication-based information on itself and on its customers and partners. In the prior art it was known to have personnel follow a user's journey through an entity's communication path and entity model (such as who handles what and why) to better understand the entity's effectiveness (or lack thereof) in moving customers or other users toward particular goals.

The prior art includes a rather primitive example of automating the following of a user's journey through an entities communication-based information path. E-commerce websites have made use of funnel analytics to better understand why and how potential customer make or do not make purchases.

In view of the difficulty of building and maintaining accurate and up to date communication-based information many online Internet-based organizations such as search engines, online marketplaces, and lead generation services provide some basic services to assist businesses in building and maintaining up-to-date communication based information. For example, Yelp, Facebook, and Google enable businesses to update their open hours and other business facts so that they are both prominently presented and accurate. While such is useful it is also incomplete and has little value beyond assisting data entry and form creation.

Given the problems even with simple ideas such as FAQs it is apparent that building up and maintaining accurate communication-based information presents major challenges. Complicating matters is when the communication-based information of a particular entity is understood as being only a subset of the wider class of global communication-based information. Any given entity represents only a small part of a very large on-line community. The once rather simple problem being faced by a multitude of modern businesses is identifying who its competitors actually are. In the prior art this was fairly easily handled by manually assigning businesses into certain categories with the understanding that those in the same local vicinity and in the same category as the assigning business were their competitors.

The foregoing no longer works effectively. Very often a major competitor may not even be identifiable let alone known, and the location of a particular competitor may not even be relevant. On-line internet business sales companies enable a tiny business in a city one has never heard of and which is located in a country one would need both time and a globe to find can put an existing business out-of-business.

Other prior art approaches to identifying competitors include allowing customers to identify such competitors, by asking businesses to self-identify, to manually search the internet, to track information from your own suppliers, and to obtain information from on-line services. Those prior art approaches are inefficient, can be manipulated, are costly, are prone to significant errors and cannot be automated. A related problem is for a business entity is to know who its customers are. Not knowing that basic information makes it extremely difficult to properly service those customers.

Some entities have the resources that enable them to address the foregoing issues. But their results can be incomplete, inaccurate, or out of date. Other entities find themselves overwhelmed by having to manage their communication-based information across so many different platforms and services. Rapid technological changes just complicate the problems. In view of the foregoing and other problems entities have been forced into seeking technology-based solutions to categorizing their own and competitors businesses, to identify their customers, as well as keeping useful communication-based information accessible and up-to-date. From the foregoing it also can be seen that it is desirable to have an accurate and up-to-date entity model of an organization such as a business.

SUMMARY OF THE INVENTION

Provided is a system that creates and automatically maintains one or more entity models that are derived from communication-based information. Each entity model encompasses facts about the entity such as who its customers and partners are, what matters to the entity, and the tone, personality, and style that the entity wishes to convey. That system uses machine learning, a user interface, a sentiment analyzer, a communication monitoring agent and an automated bot to create and to maintain each entity models. Beneficially, the automated bots are created and their initial contents populated based on a bot template. New communication-based information is analyzed using the user interface, the sentiment analyzer and the machine learning tool. That analysis is used to improve the entity model, to keep the automated bot up-to-date, and to update other services and products that the entity relies on as part of its daily operations, especially as relates to communication-based information disseminated over a network environment.

That system further enables a business to accurately and timely cluster other entities into clusters to assist identify competitors. Beneficially that system provides valuable analytical information about how users of communication-based information journeys through an entity model and from that journey identifies strengths and weaknesses of how the entity handles its client. The sentiment analyzer determines sentiments expressed within the communication-based information.

An entity data process that is in accord with an illustrative embodiment includes the steps of monitoring a plurality of communications of a primary entity, building an entity model for the primary entity based on the plurality of communications, monitoring at least one particular communication of the primary entity, applying the entity model to the at least one particular communication to generate an update to an entity datastore for the entity model, and applying the update to a particular platform via a network communication.

Beneficially the plurality of communications of that process includes electronic messages, voice communications, electronic posts, electronic broadcasts, or electronic publications. Preferably the process includes building the entity model based on a model datastore of the primary entity. In practice the process includes monitoring the plurality of communications via an application program interface ("API") enabled by a processor-enabled computing system of at least one of a telecommunication carrier, a messaging platform, a social networking platform, or an online services host.

The foregoing process may further include applying the entity model to an electronically published listing of frequently asked questions ("FAQs"), hours of operation listing, or events. If so the update to the particular platform can include changing a frequently asked question, the hours of operation listing, or the event listing, preferably by using an application program interface.

The foregoing process may also include receiving a first plurality of queries via a network, suggesting a first plurality of responses to the first plurality of queries based on the entity model, accepting selections of the suggested first plurality of responses, and updating the entity model based on the accepted selections. If so, that process may further include receiving a second plurality of queries via the network, suggesting a second plurality of responses to the second plurality of queries based on the updated entity model, accepting selections of the suggested second plurality of responses, and updating the entity model based on the accepted selections of the suggested second plurality of responses.

Beneficially the foregoing process includes receiving at a primary entity at least one query from at least one secondary entity via a network, automatically producing a response to the at least one query, sending a response to the at least one secondary entity from the primary entity, wherein the sent response is the automatically generated response or a primary user response. The process then continues by scoring the automatically generated response by determining if the sent response corresponds to the automatically generated response. The entity model is then updated base on the scoring.

The step of building the entity model may include seeding the entity model with a phone number, initiating a network lookup service to crawl for content related to the phone number from at least one point of interest datastore, and training the entity model with the content from the at least one point of interest datastore.

An entity categorization scheme that is in accord with an illustrative embodiment includes monitoring a plurality of communications with a plurality of secondary entities, analyzing the plurality of communications to determine at least one of a number of communications, time of communications, length of communications, channel of distribution of communications, or communications content of the plurality of secondary entities, and clustering the plurality of secondary entities based on the analysis into at least one cluster.

That entity categorization can further include crawling a computer network for published data regarding the plurality of secondary entities, determining a plurality of entity types of the plurality of secondary entities based on the published data, monitoring communications of a particular secondary entity corresponding to a particular entity type, and then assigning the particular secondary entity to a cluster based on the particular entity type, the monitored communications of the secondary entities, the clustering of the plurality of secondary entities and the plurality of entity types of the plurality of secondary entities.

Alternatively, that entity categorization can include crawling a computer network for published data of the plurality of secondary entities, determining a particular entity type of at least one of the plurality of secondary entities based on the published data, monitoring communications of particular secondary entities corresponding to a particular entity, and assigning the particular secondary entity to a new cluster based on the monitored communications.

Entity categorization may include crawling a computer network for published data of the plurality of secondary entities, determining based on the published data a first entity type for a first particular entity and a second entity type for at least a second particular entity and for a third particular entity of the secondary entities, determining if the first particular entity, the second particular entity, and the third particular entity are in the same cluster, and then flagging the first particular entity responsive to determining the first particular entity is in the same cluster and determining the first entity type for the first particular entity and the second entity type for the at least the second particular entity and the third particular entity.

Entity categorization may include crawling a computer network for published data of the plurality of secondary entities, determining based on the published data a first entity type that corresponds to a first particular entity and a second entity type that corresponds to at least a second particular entity and to a third particular entity, determining if the first particular entity, the second particular entity, and the third particular entity are clustered in a same cluster; and then re-crawling the computer network for published data of the first particular entity to re-determine the entity type of the first particular entity responsive to determining the first particular entity, the second particular entity, and the third particular entity are clustered in a same cluster and determining the first entity type corresponds to the first particular entity and the second entity type corresponds to the at least the second particular entity and the third particular entity.

Entity categorization may include determining a representative entity of a particular cluster of the plurality of clusters based on the plurality of communications of the plurality of secondary entities in the particular cluster, crawling a computer network for published data of the representative entity, determining based on the published data the entity type corresponding to the representative entity, and then assigning the entity type of the representative entity to a plurality of other secondary entities in the particular cluster.

Entity categorization may include determining based on the comparing at least one of a conversation topic trending in a particular cluster of the plurality of clusters or an increase in communication volume in the particular cluster.

A method for routing online conversations that is in accord with an illustrative embodiment includes receiving a plurality of communications from a plurality of secondary entities during a plurality of electronic communication sessions, wherein the plurality of communications include a plurality of conversions, training a likelihood of conversion model based on the plurality of communications and on the plurality of conversions, receiving via a network particular communications from a particular secondary entity during a particular communication session, using an artificial response system to respond to the particular communications, analyzing the particular communications to determine a likelihood of conversion based on the conversion model, and handing off the particular communication session from the artificial response system based on the likelihood of conversion.

The method for routing online conversations may be practiced wherein the plurality of communications comprise textual online chat queries. Alternatively, the method for routing online conversations may be practiced wherein the plurality of conversions include actuations by the plurality of secondary entities of a particular indicator in a user interface during the plurality of electronic communication sessions. The method for routing online conversations may further include handing off the particular communication session to a user of a primary entity and providing the primary entity with an indication of the likelihood of conversion.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 1 diagrammatically illustrates the major components of a system 10 which includes an entity intelligence engine 12 for constructing and automatically updating entity models, for producing a cluster model of competitors, for implementing an automated bot 43 based on a bot template 45, as well as a user interface 42 and a sentiment analyzer 61 for analyzing communication-based information;

Figure 4:
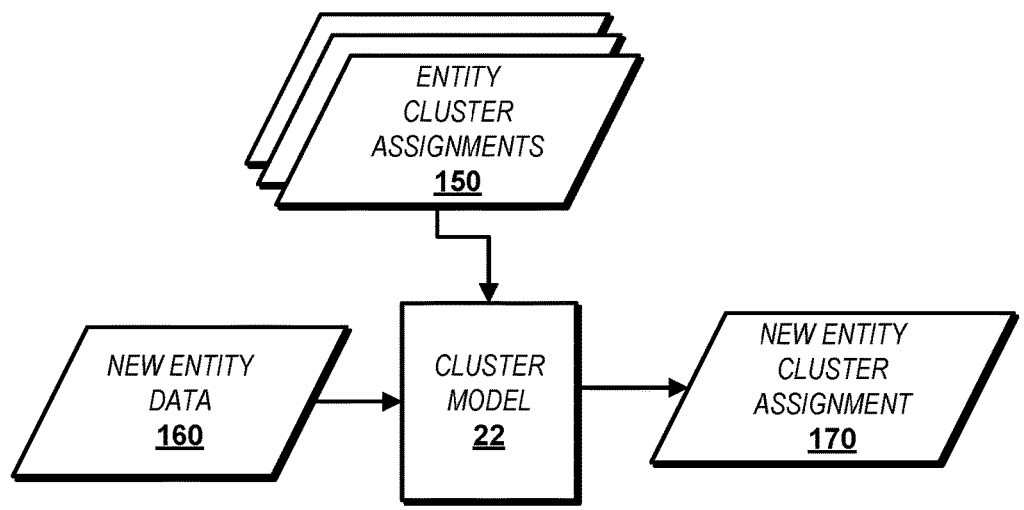
Figure 5:
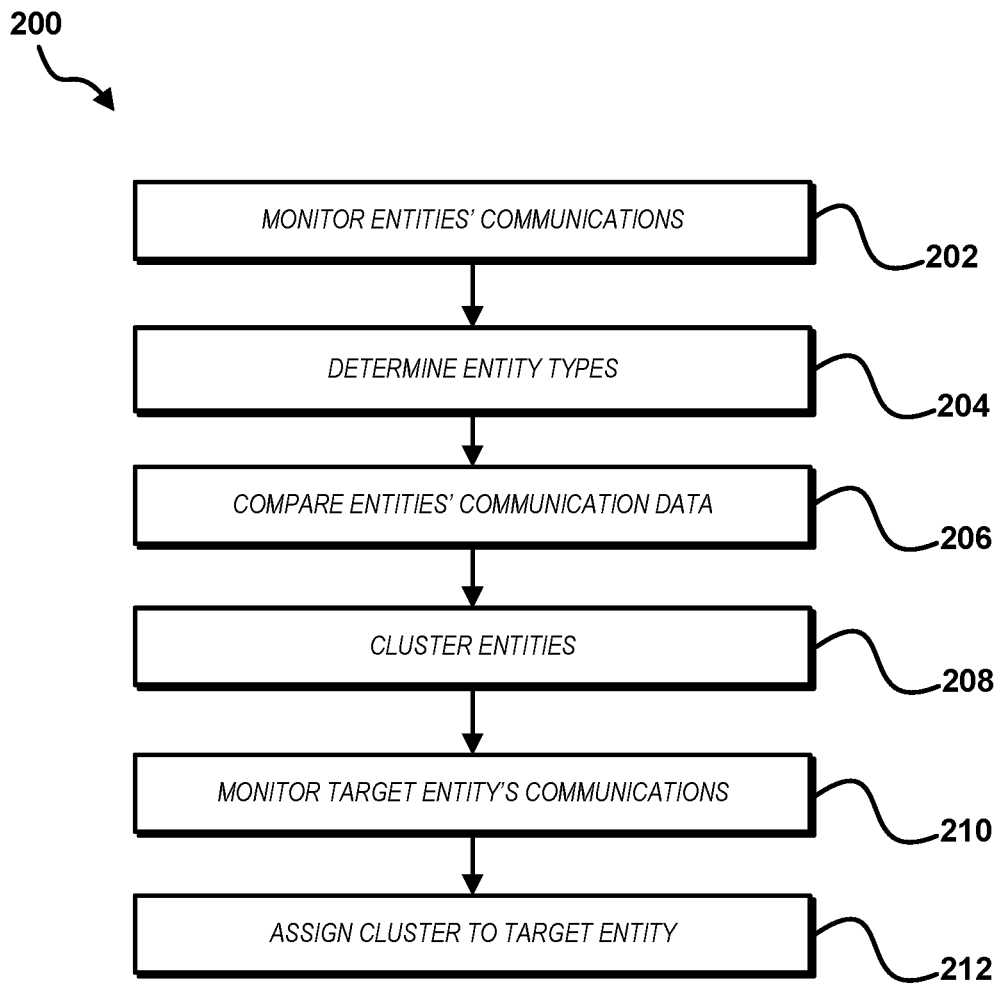
Figure 6:
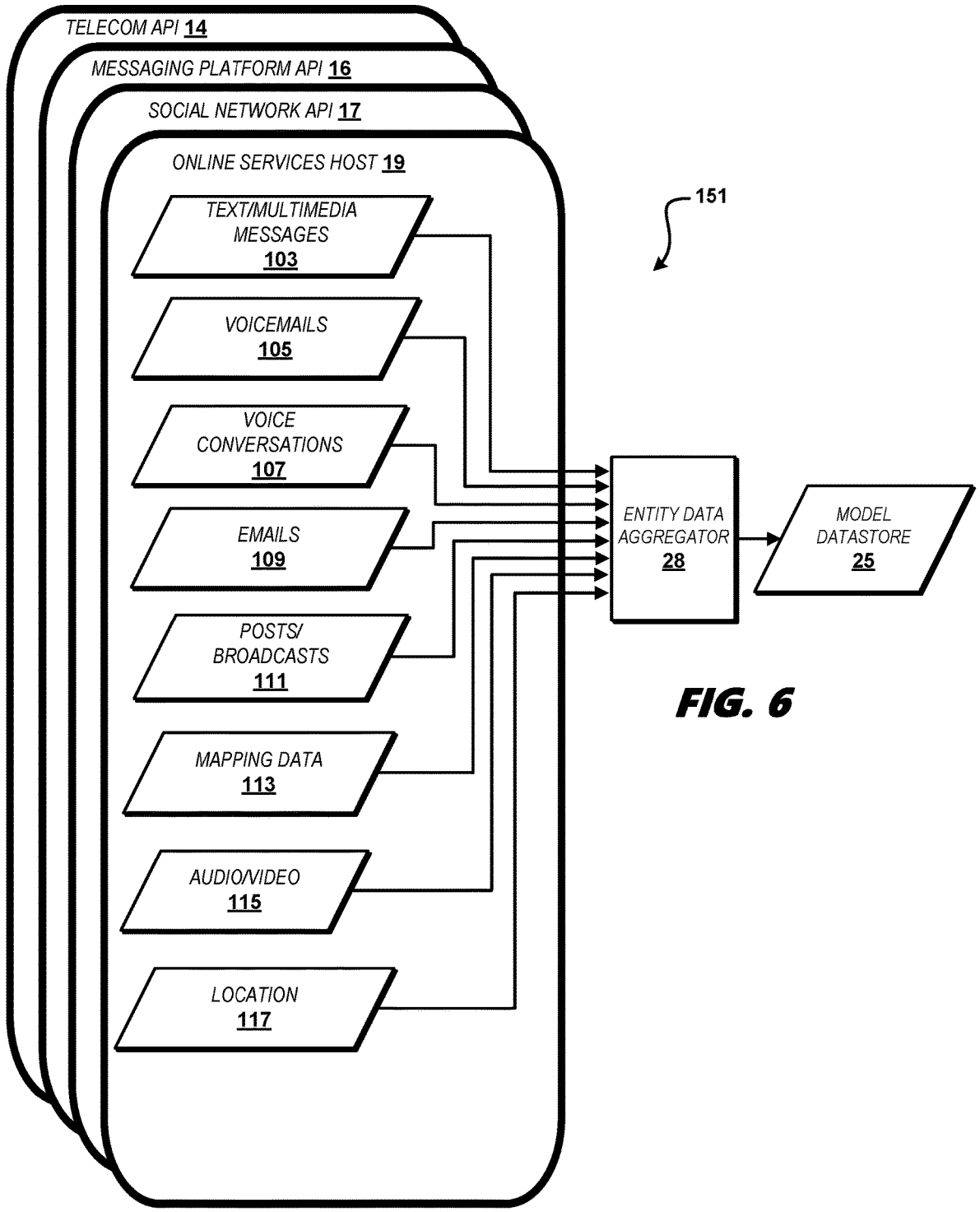
Figure 7:
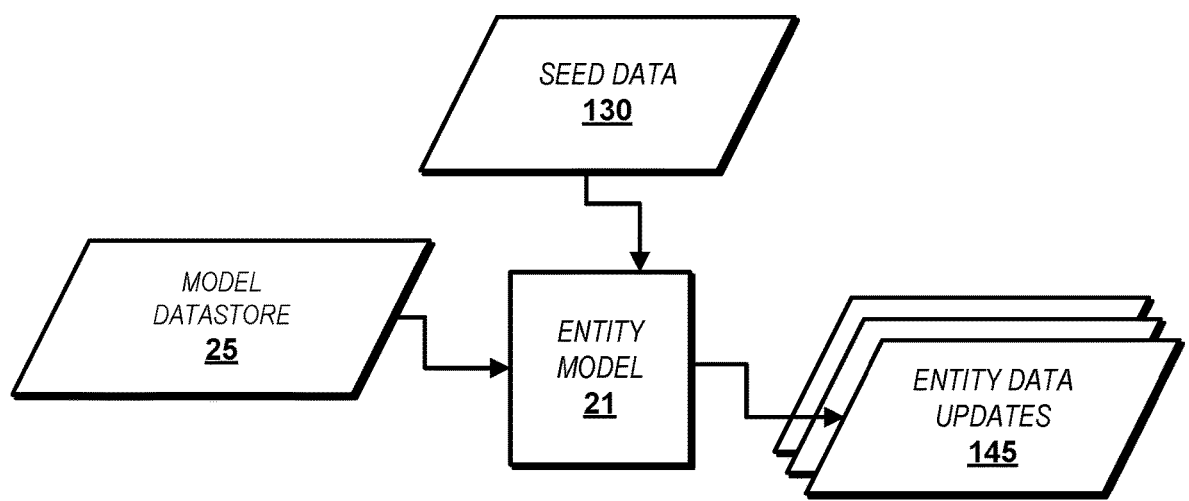
Figure 8:
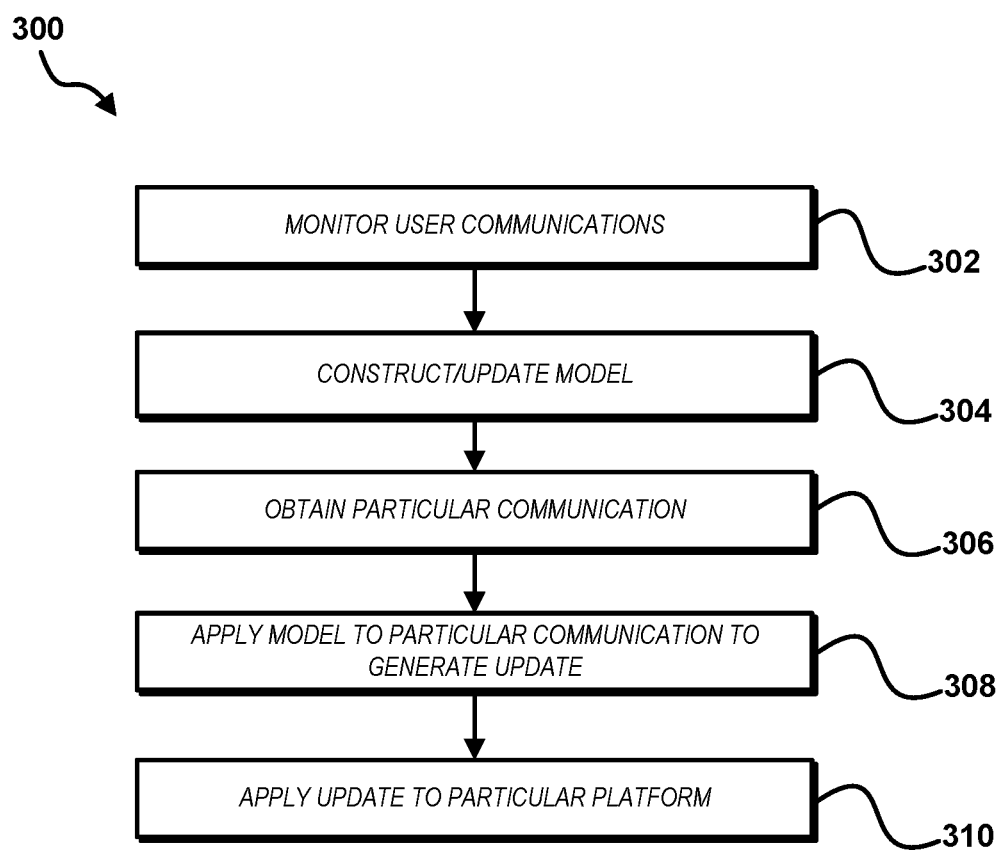

FIG. 4 is a schematic showing the data flow of an update process for determining a new entity cluster assignment 170 based on existing entity cluster assignments 150 and on new entity data 160;

FIG. 5 is a flowchart showing a process 200 of assigning a cluster to a target entity;

FIG. 6 schematically illustrates the data flow in a process for updating a model datastore 25;

FIG. 7 is a schematic showing the data flow for updating an entity model 21 using seed data 130 and the model datastore 25 by producing entity data updates 145;

FIG. 8 is a flow chart of an entity data update process 300.

Figure 9:
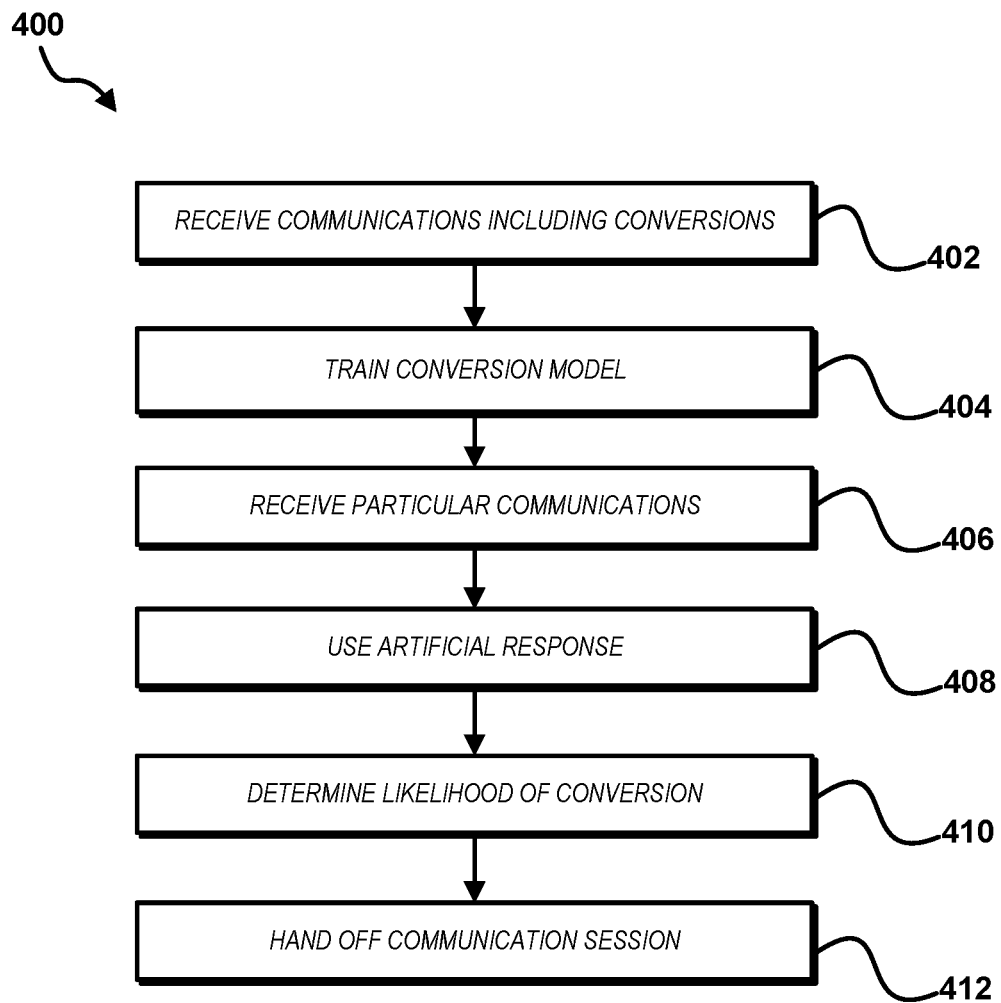

FIG. 9 is a flow chart of a process 400 for routing online conversations.

FIGS. 10A, 10B, 11A, and 11B show displays generated by the user interface 42 illustrating methods described herein.

DETAILED DESCRIPTION OF ILLUSTRATIVE EMBODIMENT(S)

Figure 1:
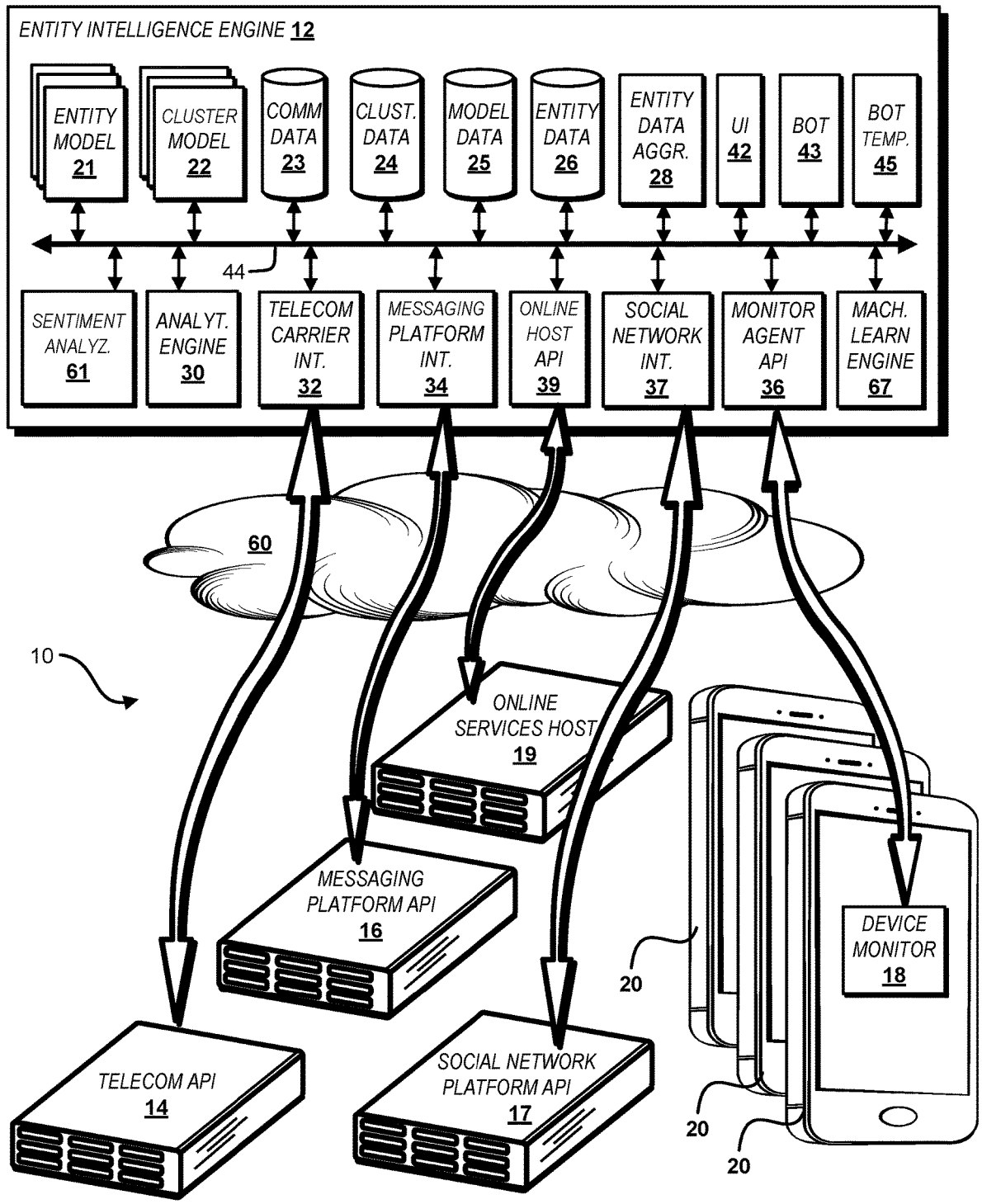

Referring to FIG. 1, a system 10 is shown that automatically provides for an accurate and up-to-date entity model 21 derived from communication-based information that is received or sent from an organizational entity such as a business, a union, a cooperative, a public entity, or a charity over a network.

In view of the wide range of different organizational entities that can benefit from the described system 10, in view of the large number of different entities that transmit or receive communication-based information over networks, and in view of the need to clearly identify various parties that impact on the system 10, the entity that runs or owns or uses or obtains the principle benefit from the system 10 is referred to hereinafter as the primary entity. Other entities that converse with the system 10, such as business competitors, on-line services, social networks, entities that make use of telecommunications that are monitored by the primary entity, messaging platforms and others whose communications are processed by the system 10 to benefit the primary entity are referred to hereinafter as secondary entities.

To simplify the various examples provided below it will usually be assumed that the primary entity is a business. However, as already noted that is not a requirement of the system 10. While the system 10 is principally an automated system, at times a human operator is needed to either initiate operations (such as by entering a phone number) or to make use of the output of the system 10. Such person or persons are referred to hereinafter as principle users if they represent the primary entity or secondary users if they represent the secondary entities.

Referring now primarily to FIG. 1, the system 10 makes extensive use of communication-based information that includes facts about the primary entity and information about secondary entities such as competitors, customers, partners, and users in general. The system 10 is directed to automatically producing an entity model 21 which encapsulates the primary entity using an entity intelligence engine 12 that automatically aggregates competitors for identification, keeps Frequently Asked Questions (FAQs) accurate, machine learns from the communications, sets the tone, personality, and style that the primary entity wishes to convey, provides automatic feedback into the entity model 21, and operates an automated bot 43 based on an input bot template 45 which is automatically filled in by the system 10.

Importantly, the entity model 21 is automatically updated using communication-based information which may include making use of a user interface 42, stored data in datastores such as a cluster datastore 24 (regarding clustered organizations, see below), an entity datastore 26 (regarding specific data about the primary entity and possibly secondary entities), a communication datastore 23 (regarding storage of historical communications), a model datastore 25 (regarding specific data important to the primary entity's model 21), and a monitoring agent 36 that monitors communications from connected services which provide information regarding secondary entities.

The entity intelligence engine 12 is configured to acquire data from a processor-enabled telecommunication carrier application program interface ("telecom API") 14, from a messaging platform API 16, from a social network platform API 17, from an online services host 19, and from a device monitor 18 that handles communications to and from communication devices 20. The entity intelligence engine 12 functions through a communications network 60, preferably which includes one or more wired or wireless networks or combinations thereof. The communications network 60 transfers communications to and from the entity intelligence engine 12 via the telecom API 14, the messaging platform API 16, the social network platform API 17, the online services host 19, and the device monitor 18, and thus via the communication devices 20.

To enable communications over the communications network 60 the entity intelligence engine 12 includes a telecom carrier interface 32, a messaging platform interface 34, a monitoring agent API 36, a social network interface 37, and an online host API 39. In addition, the entity intelligence engine 12 further includes a user interface 42, a machine learning system 67, and a sentiment analyzer 61. All of those subsystems of the entity intelligence engine 12 communicate with other subsystems via a bidirectional bus 44.

It should be understood that the system 10 includes one or more processors that operate in accord with underlying software. The entity intelligence engine 12 can be implemented on a single system at a single location or it can be decentralized such as in a peer-to-peer configuration, for example by operating in a distributed manner on two or more of the communication devices 20 or other network-situated components.

Still referring to FIG. 1, the entity intelligence engine 12 acts as both a publishing server and a monitoring server with regards to connected services, platforms, and applications. The entity intelligence engine 12 enables the entity model 21, a clustering model 22, the communication datastore 23, the cluster datastore 24, the entity datastore 26, an entity data aggregator 28, an analytics engine 30, as well as the telecom carrier interface 32, the messaging platform interface 34, the monitoring agent API 36, the social network interface 37, and the online host API 39. The entity intelligence engine 12 is implemented to selectively receive requests from and to publish data to all of those sub-systems.

The device monitor 18 is beneficially a software-enabled application executed by a standalone device, a plurality of devices, or provided integral with an operating system and/or particular hardware. The communication devices 20 can be personal computers, smartphones, tablet computers, or other processor-enabled devices that are operable on the wired and/or wireless communication network 60 via the device monitor 18.

Figure 2:
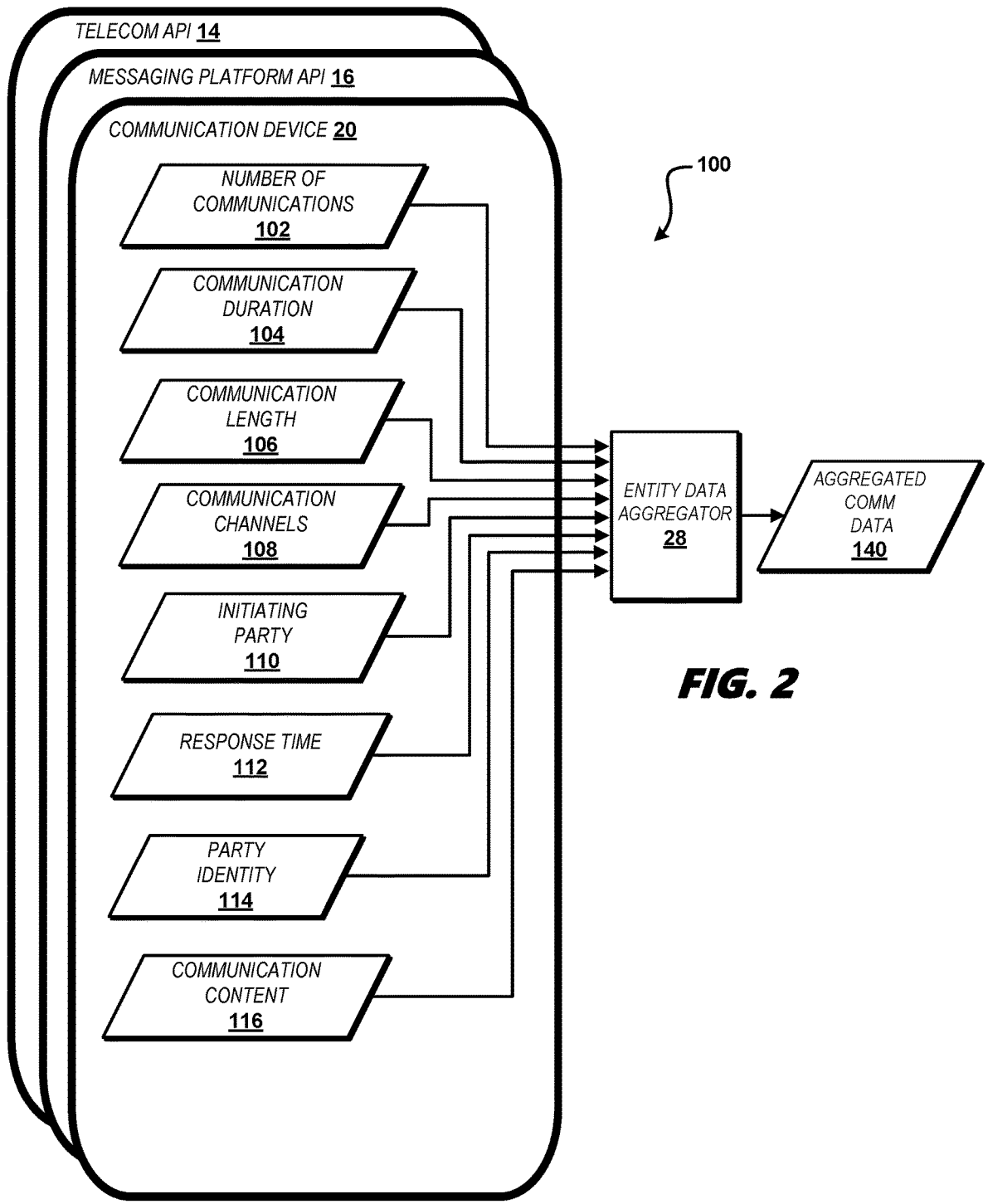
FIG. 2 is a schematic showing data flow through the devices of the system 10 when aggregating communication-based information.

Turning to specific functional operations and referring now specifically to FIG. 2, the system 10 enables a data flow 100 that uses the entity data aggregator 28 to aggregate communication-based data 102, 104, 106, 108, 110, 112, 114, 116 from the communication devices 20 which are associated with a plurality of primary and secondary entities, from the telecom API 14, and from the messaging platform API 16, for example data from particular businesses that communicate via a telecom which supports the telecom API 14 and via a messaging platform which supports the messaging platform API 16. The specific purpose of aggregation performed in the data flow 100 is described below.

Figure 3:
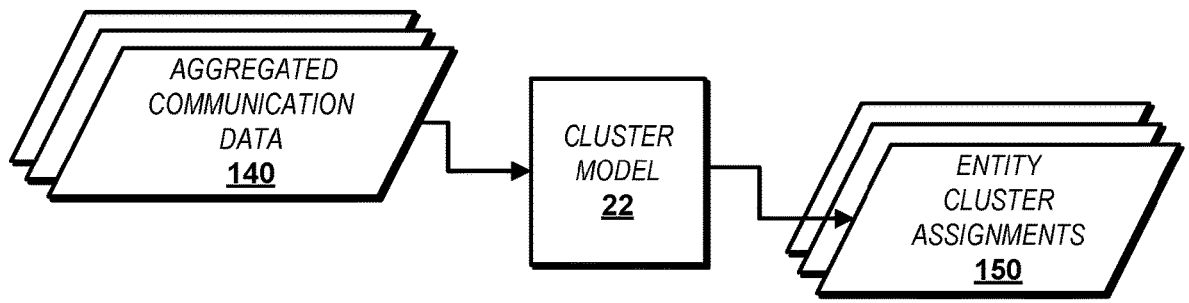
FIG. 3 is a schematic showing the data flow in a process for determining entity cluster assignments 150 when clustering entities together.

Referring now to FIGS. 1 and 3, the clustering model 22 receives the aggregated communication data 140 from one or more of the secondary entities. The clustering model 22 assigns each of the secondary entities into one (or more) entity cluster assignments 150 based on an analysis of the aggregated communication data 140.

Referring now also to FIG. 4, entity cluster assignments 150 are fed back into the cluster model 22 to improve the cluster model 22. Data 160 from a new entity can include a new entity cluster assignment 170 which is not currently part of the cluster model 22. For example, a new type of business (e.g., a hair salon, a bank, a supermarket) might be identified in the aggregated communication data 140 and assigned to be new entity data 160 which is applied to the now improving cluster model 22, which then produces a new entity cluster assignment 170. This is a form of machine learning based on analytical analysis of communication-based information. Thus the machine learning system 67, the sentiment analyzer 61, the analytics engine 30 as well as the user interface 42 are called upon as required to enable analysis.

Communication-based information is gathered, new information is input, the entity intelligence engine 12 takes steps to improve the cluster model 22 and, if appropriate, the cluster model 22 creates a new entity cluster assignment 170. The system 10 automatically feeds operations back onto itself to obtain new insights which updates the system 10 (in this example the cluster model 22).

Referring now to FIG. 5, the system 10 also implements an entity categorization process 200 which is performed using one or more processors within the entity intelligence engine 12. The categorization process 200 includes monitoring a plurality of secondary entity communications from a plurality of secondary users which correspond to a plurality of secondary entities (step 202). Then, the entity categorization process 200 proceeds by determining a plurality of entity types for the plurality of secondary entities (step 204).

Still referring to FIG. 5 communication data from the plurality of secondary entities are compared with each other based on the number of communications, the times of communications, the lengths of the communications, and the channels used to distribute the communications, and the communications content of the plurality of users (step 206). Pluralities of secondary entities are then temporarily clustered together based on the comparing (step 208). Communications for targeted secondary entities which have a high probability of matching a particular entity type are then monitored (step 210). If the probability of a secondary entity being of a particular entity type meets a threshold value that targeted secondary entity is permanently assigned to a cluster (step 212).

From the foregoing it can be seen that the entity intelligence engine 12 receives communication-based information and then probabilistically analyzes that information in an attempt to reveal useful data. Such analysis may involve historical samples of communication-based information that are stored in the communication datastore 23 as well as real time monitoring of communications by the user interface 42 based on the clustering model 22.

The system 10 aggregates secondary entities into clusters based on data from text messages such as emails but also from channels such as Facebook Messenger™, Apple's iMessage™, or other messaging platform. In addition the system 10 analyzes voice communications from the devices 20 using the user interface 42 as well as the sentiment analyzer 61 if required.

The system 10 makes use of several layers of communication-based signals to categorize secondary entities to identify competitors or potential partners. In particular the system 10 analyzes communication metadata such as the number of communications across a channel, the times of those communications, the length of communications, the distribution channels used, whether a communication is initiated by a secondary entity or by an outside party, who the outside party is (preferably combined with demographic or other information about the outside parties), response times, and other relevant data. The system 10 then matches analyzed communication-based information with patterns learned from other secondary entities. From the results of that analysis the system 10 clusters secondary entities that have similar metadata patterns together. For example, businesses that field about the same volume of communications at relatively similar times in similar manners with similar types of customers are clustered together into a competitor cluster.

With textual communications (such as SMS text messages), the system 10 analyzes the communication-based information using the user interface 42 and the sentiment analyzer 61 to find keywords or content, or it can use Natural Language Processing (NLP), or other machine learning mechanisms to understand intents, semantics, and sentiment within the communication-based information.

It should be understood that voice communications are beneficially handled by transcribing spoken messages into text for further processing by the user interface 42. The result is that the system 10 looks at some or all of the communication-based information, matches it against patterns learned from looking at information from other secondary entities, and then automatically clusters secondary entities (such as businesses) that exhibit similar patterns together.

Clustering based on metadata and clustering based on communication content are not mutually exclusive. Secondary entity clustering using a weighted approach in many instances is preferred. In any event the desired result is that secondary entities get clustered with similar secondary entities with one major goal being to cluster competitors together. As provided above communication-based information from a secondary entity of an unknown category can be examined probabilistically to assign that secondary entity into a cluster, possibly into a new cluster.

The system 10 also identifies errors in existing secondary entity clusters. For example, a web crawler directed to automatically cluster businesses based on keywords on their website is likely to make certain repeated errors. Proper analysis of communication-based information from the web crawler provides an early identification of potential errors, thus saving a primary entity from make serious mistakes in relying on a given cluster. For example, a cluster may contain mostly nail salons, barber shops, and hair salons as determined by the web crawler. However, a more detailed analysis may reveal that a given business may more likely be a bowling alley. Once such conflict is flagged another review process can properly cluster that business. Again, an example of the system 10 feeding back information to improve its operation. A re-crawl of the network is beneficially performed when such conflict is determined to properly cluster a particular entity. By re-crawling for a specific entity based on such conflict rather than re-crawling a large portion of a network at periodic or frequent intervals, system processing and network bandwidth resources are conserved.

The system 10 also clusters secondary entities more efficiently by identifying one or a few of the secondary entities that are "central" to each cluster and considering those prototypical secondary entities. Identification of such prototypes can assist in probabilistically determining what cluster a secondary entity belongs in. This can reduce the resources required to cluster secondary entities one-by-one. The system makes category gathering and clustering more efficient by directing where efforts will be most impactful thereby conserving processing resources and network bandwidth.

As previously noted, a primary entity has an interest in keeping its communication-based information up-to-date. The system 10 beneficially examines and analyzes an entity's communication-based information to construct an entity model 21 that is automatically kept up-to-date by the system 10. Once an entity model 21 exists, data analyzed by the system 10 is fed back into that entity model 21 for automatic corrections and additions and to keep information fresh.

Refer now to FIG. 6 for a data flow 151 that shows how the entity data aggregator 28 aggregates data 103, 105, 107, 109, 111, 113, 115, 117 including communication-based information regarding a particular entity, for example a particular business, from the telecom API 14, from the messaging platform API 16, from the social networking platform API 17, from the online services host 19 (see FIG. 1). The aggregated data is input into the model datastore 25 which stores that data to support future updating of the entity model 21. The online services host 19 may also receive communication-based information regarding a particular entity from the telecom API 14, from the messaging platform API 16, and from the social networking platform API 17 and provide that information to the entity data aggregator 28 via the online host API 39.

Referring now to FIG. 7 an entity model 21 for the primary entity is initially primed with seed data 130. That entity model 21 also receives entity data, if any, from the model datastore 25. As the data in the model datastore 25 changes as a result of new information from the entity data aggregator 28, or as a result of incoming seed data 130, the entity model 21 outputs entity data updates 145. The entity data updates 145 are then applied to the model datastore 25 (thus providing automatic updating) and to various platforms including network-accessible applications and services.

Entity data updates 145 can result because of requests to various platforms from the entity intelligence engine 12 (e.g., social networking platform API 17, online services host 19, or a consumer rating website). Alternatively, requests from various platforms can be made to the entity intelligence engine 12 resulting in entity data updates 145. In addition, the entity data updates 145 may be published via the entity intelligence engine 12 and its bot 43 to the various platforms. Entity data updates 145 can include for example updates to website FAQs, hours of operations, or event listings. The initial seed data 130, data from the model datastore 25 as well as existing information in the entity model 21 itself are used in constructing or updating the entity model 21.

Refer now to FIG. 8 for a flow chart of a platform update process 300 that is performed by one or more processors of the entity intelligence engine 12. The process 300 includes monitoring a plurality of user communications from secondary users of a particular entity (step 302). The process 300 then constructs or updates the entity model 21 based on that plurality of communications (step 304). One or more particular communications are then obtained via monitoring (step 306). That communication is then applied to the particular entity model 21 to generate the entity data update 145 (see FIG. 7) for a particular platform (step 308). That update is then applied to the particular platform (step 310).

Regarding Frequently Asked Questions ("FAQs") for example, the system 10 is programmed to understand a customer's question such as "What time do you close on Tuesdays?" by using Natural Language Processing (NLP) techniques in the user interface 42. The system 10 then correlates that specific question with questions about closing times in general. As that customer's question relates to the general question of the standard Tuesday closing time (as opposed to the coming Tuesday being a holiday) the primary entity's corresponding reply "5:00 pm" is deconstructed to meaning 5:00 pm local time. That FAQ can be added to the entity's model 21. The specific answer can then be sent to the customer via the bot 43.

Connected services and products can query the entity model 21 for facts. For example, Yelp™ might query the entity model 21 in order to determine the primary entity's open hours. The system 10 also implements a publishing server in the telecom carrier interface 32 that publishes the updated fact to any connected services and products that are listening for updates. For example, software that renders the primary entity's FAQs on their website would receive a notice of the new fact and the website would then update its website's FAQs accordingly.

The system 10 also implements the messaging platform interface 34 so that it monitors connected services and products and notices when they contain conflicting or out-of-date facts. For example, the messaging platform interface 34 might notice that Google™ server incorrectly lists Tuesday's closing time as 6:00 pm in its local search directory. The system 10 would then direct the telecom carrier interface 32 to programmatically register the change with the Google™ server or to create a notice to effect such change.

Facts may be temporary in nature and still be valuable. "Will you be open this Labor Day?" and "Will you have normal hours during the City's Centennial Parade?" are examples of customer-driven questions that can be processed by the system 10 to inform the entity model 21 and to keep connected services and products up-to-date and accurate.

The entity model 21 encompasses many facts about the primary entity including who its customers and partners are, what matters to the primary entity, its customers and partners, and the tone, personality, and style that the primary entity wishes to convey. Such facts are applied to and extracted from the entity model 21 and are kept up to date by way of communication-based information that is applied to the system 10.

The monitoring of communication-based information can be performed in real-time or by reviewing historical data stored in the communication datastore 23. The telecom carrier interface 32 can access communication-based information by locating a server within a telecom network via the telecom API 14 or other network connection, by receiving a bulk handoff of communication-based information from a telecom network, or by receiving communication-based information from terminals, apps, and endpoint systems that service the primary and secondary entities.

Communication-based information can include texts, voicemails, voice conversations, messages on messaging platforms such as Facebook Messenger™ and Apple's iMessage™, emails, social media posts and broadcasts, and other social media messaging including photos and direct messages. While the foregoing examples feature communications with customers, information relevant to building up the entity model 21 can be extracted from the primary entity's communications with others including employees, vendors, partners, potential employees, and other parties.

Communication-based information can be supplemented by monitoring the primary entity's website, its listings on services like Yelp™, Google™, and Facebook™, and other online presence. Communication-based information can be supplemented by aerial, satellite, street view, or first person imagery and/or video. Communication-based information can also be supplemented by other entity information (e.g., inventory, sales transaction data and metadata, and employee schedule information) supplied directly or via integration with hardware or software the primary entity uses as part of their operations (e.g., inventory management software, point of sale systems and registers, or an internet connected employee time clock). Communication-based information may also be supplemented by secondary entities such as customers, employees, or partners, either contributed directly or indirectly (e.g., customers' check-in data via Foursquare™).

Information in the entity model 21 can be supplemented or contributed directly by a representative of the primary entity or by a member of the public or by another secondary entity on behalf of the primary entity. Primary entity review policies can be set such that extracted information must be reviewed, confirmed and approved by a primary user before being made a part of the entity model 21. Such review may depend on the type of information and/or on the confidence of the system 10 in the information.

The machine learning systems and algorithms of the system 10 can be seeded with knowledge about what it can learn and what it should be on the lookout for when the system 10 examines inbound and outbound communication-based information. For example, the system 10 might be seeded with the primary entity's business hours, accepted forms of payments, location, tone of voice, and other inputs. The system 10 can also be updated over time either automatically or by a primary user or by a secondary user on behalf of the primary entity.

The machine learning systems and algorithms of system 10 can further learn from data and insights from secondary entities and their communications. For example, the system 10 may learn from one restaurant that dietary and allergy-relevant menu information is a key part of that restaurant's model. From that the primary entity can determine that it should pay extra attention to related conversations when building up the entity model 21.

The entity model 21 is beneficially implemented such that the system 10 understands the idea of multiple locations and potential relationships between multiple locations of a primary entity, for example whether it is a franchise or chain. Certain pieces of the entity model 21 may be shared or replicated across multiple related locations. Such pieces include the preferred tone of communication-based information under an umbrella brand even though each location may have its own hours, specials, or other local practices, and each location will almost certainly have its own unique mailing address.

Once an accurate and up-to-date entity model 21 is constructed by the system 10, the system 10 actively keeps that entity model 21 updated. For example, by actively keeping FAQs up-to-date as more communication-based information is received. Referring now back to FIG. 1 the system 10 performs this by monitoring communication-based information made available to the user interface 42 from the telecom carrier interface 32, from the messaging platform interface 34, from the monitoring agent API 36, from the social network interface 37, and from the online host API 39 by the bus 44.

The user interface 42 processes the communication-based information by converting it into a usable format (such as text) and then compares that communication-based information to the information stored in the entity datastore 26. Beneficially the system 10 implements a self-scoring process based on predictions. The system 10 evaluates the strengths and weaknesses of the entity model 21 by predicting answers to inbound questions, those predicted answers are then compared to answers from the entity model 21 (which are available in the entity datastore 26), and finally the system 10 compares the predicted answers to the actual answers supplied by the primary entity.

Knowledge areas where predicted answers conform to actual answers with a high probability are internally scored by the system 10 as performing well, while knowledge areas where predicted answers differ from actual answers are internally scored lower. Poor performing portions of the entity model 21 are flagged as being uncertain, and if they are poor enough, they are dropped from the entity model 21.

The system 10 automatically couples the results of the user interface 42 to the entity datastore 26 so as to generate quick reply answers. Such "quick reply" answers serve as a shortcut for automatically populating a message input field of the entity datastore 26, thereby saving the time and effort to manually enter the same answer by hand into the entity datastore 26.

Figure 10A:

For example, if an inbound message inquiry is understood by the user interface 42 as asking "Do you serve alcohol?" the system 10 can bucket possible answers as "No," "Wine & Beer Only," or "Full Bar." See FIG. 10A showing the communication device 20 enabling a display 80 generated by the user interface 42 of the entity intelligence engine 12. If the primary user responds with the "Full Bar" option the user interface 42 automatically applies that information to the entity intelligence engine 12 which then updates the entity datastore 26 (and thus the entity model 21) with that information.

Figure 10B:
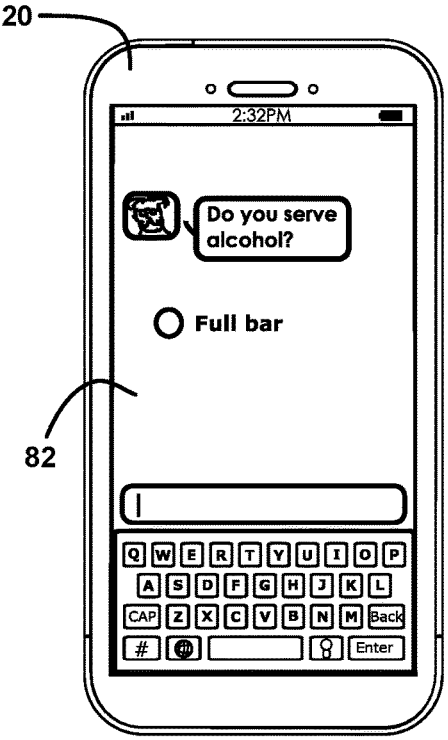

As confidence levels of the underlying entity model 21 increase superfluous quick reply options are dropped. Then should a customer ask "Do you serve alcohol?" the user interface 42 only presents the "Full Bar" option to the primary user. See FIG. 10B showing the communication device 20 enabling a display 82 generated by the user interface 42 of the entity intelligence engine 12. Each time the primary user selects the "Full Bar" option the quick reply option of the underlying entity model 21 is reinforced. If the primary user ever chooses to type or otherwise enter another response the user interface 42 confidence is lowered and the response from the primary entity is examined to extract the meaning and to refine the underlying entity model 21. This allows less certain knowledge to be more quickly refined and reinforced.

Through use the system 10 identifies gaps in its knowledge (e.g., the entity model 21 does not have information regarding a matter such as the time a business entity closes on Tuesdays); identifies possible conflicts in its knowledge (e.g., the entity model 21 indicates that the primary entity closes at 5:00 pm on Tuesdays but the system 10 receives via the user interface 42 information that the primary entity closes at 6:00 pm on weekdays or the system 10 detects signs of traffic after 5 pm); identifies knowledge that may be stale (e.g., the system 10 learned a year ago that the business closes at 5:00 pm on Tuesdays but hasn't had that knowledge confirmed in a while); and identifies knowledge that needs to be re-affirmed for some reason or another.

The system 10 also creates training questions whose answers serve to confirm or correct or fill in targeted knowledge. For example, the system 10 might construct simple questions such as "What time do you close on Tuesdays?" or "What time do we close on Tuesdays?" Such training questions are posed to the primary user via the user interface 42. When a question is answered the user interface 42 then updates the underlying entity datastore 26 and thus the entity model 21.

The system 10 also provides a dedicated interface or channel for training questions. For example, the system 10 might provide a web-accessible interface that presents training questions to a primary user and which then allows the primary user to supply answers. Such questions can be presented singularly to the primary user or they can be presented selectively to certain primary entity employees or associates based on knowledge domain, seniority, or other role-based rules.

Alternatively, the system 10 can insert training questions into inbound communications. For example, the system 10 might automatically transmit the text "What time do you close on Tuesdays?" to the primary entity via the entity intelligence engine 12, which the primary entity then answers in accordance with its policies for answering texts from customers, partners, or other inquirers. This represents another example of the system 10 using automated feedback to improve the entity model 21.

The system 10 also enables preemptive training questions. A special class of training questions are those that the system 10 determines to ask preemptively, before knowing that the knowledge in question is applicable to the primary entity. For example, the system 10 may know from examining one or more secondary entity communications that customers often ask a particular type of primary entity about whether customer parking is available at the primary entity's location. The system 10 can then formulate a corresponding training question and ask any primary entity for which it doesn't know that answer.

In addition, the system 10 includes a mechanism that allows a primary user to provide feedback to the entity intelligence engine 12 that a question, whatever its source, is unimportant or irrelevant (e.g., asking an online-only retail storefront about the presence of customer parking). Such feedback is driven back into the underlying entity model 21, further refining that entity model 21. This is another example of the system 10 using automated feedback to improve the entity model 21.

Figure 11A:
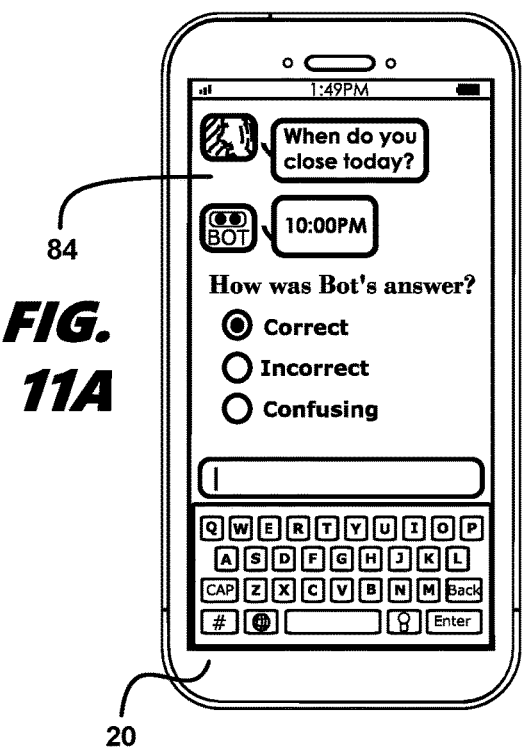

The system 10 specifically provides feedback loops for entity intelligence engine 12 auto-replies. One intended use of the entity intelligence engine 12 is to power auto-replies to commonly recognized inbound questions on behalf of the primary entity. The monitoring of conversations and prediction-based scoring may be insufficient to tune the entity model 21 if the system 10 is reacting to its own responses. Other feedback signals then become key such as: enabling a secondary user to flag a response as incorrect, confusing, or otherwise insufficient; providing the primary entity with the user interface 42 for reviewing conversations and for flagging particular responses as incorrect, confusing, or otherwise insufficient; providing the primary entity with the user interface 42 which reviews the knowledge contained in the underlying entity datastore 26 in order to flag and correct anything that is incorrect or inaccurate; and for providing natural language processing in the form of a sentiment analyzer 61 which detects negative sentiments, confusion, or other signals that an auto-reply answer is not acceptable to the secondary entity and such that the reply answer can be escalated, reviewed, and possibly corrected by the primary user. See FIG. 11A showing the communication device 20 enabling a display 84 generated by the user interface 42 of the entity intelligence engine 12 allowing a user (e.g., a primary user) to flag a bot response as "correct", "incorrect", or "confusing".

Figure 11B:
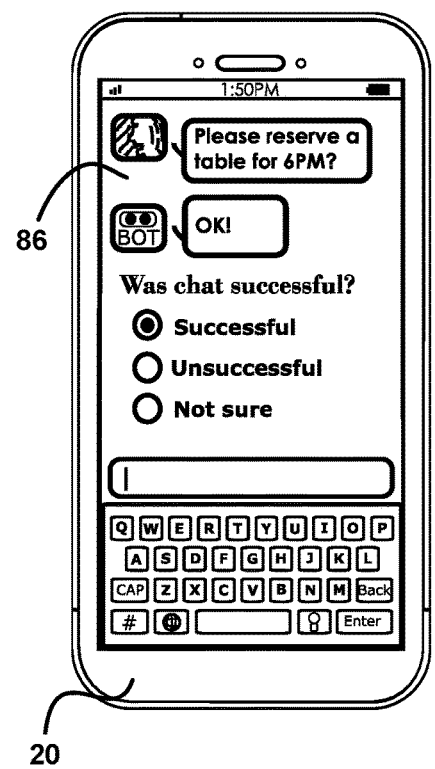

A combination of training questions and selective auto-reply answers which are reviewed by a primary user is a key optional implementation of the system 10 for ensuring accurate performance when used in combination with auto-reply functionality. In practice the system 10 is trained by using a sample of conversations. Ideally these are actual conversations between the primary entity and a secondary entity, such as a customer. Each conversation is tagged as being successful or not based on some definition of success. Tagging can be performed manually or automatically. Once tagged those conversations are used in the machine learning engine 67 which then learns the characteristics of each message and conversation and whether it was ultimately successful or that it failed. A success is considered a "conversion". See FIG. 11B showing the communication device 20 enabling a display 86 generated by the user interface 42 of the entity intelligence engine 12 allowing a user (e.g., a primary user) to flag a chat conversation as "successful", "unsuccessful", or "not sure". The machine learning engine 67 can learn the vocabulary needed to identify the date, the time, the day of the week, the day of the month, the tone and sentiment, the response times, the reading levels used in the communication-based information, the communication channel that was used, and any demographic or other identifying information that might be learned.

The machine learning system the 67 initially performs a test to score a particular message or conversation. That score represents the probability that the message or conversation will lead to a conversion. For example, the machine learning system 67 may determine that an inbound message of "do you have any coupons?" at 11 AM on a Wednesday may represent a low probability of a beneficial conversation whereas a message of "can I get delivery right now?" at the same time may be identified as representing a high probability of success.

The system 10 informs the primary user about its highest scoring and lowest scoring sets of conversations, topics, and characteristics. Such enhances the primary user's understanding of the current practices and characteristics of the system 10 and enables the primary user to have a better understanding of its practices and secondary users. Ongoing and new conversations can by prioritized. Given several conversations to attend to, the primary user can use the system 10 to attend to those that have the highest probability of success. For example, ongoing electronic conversations with a high probability of conversion that are being handled by a bot 43, can be handed off to a human primary user. Or, slightly more nuanced, the system 10 can model the impact of wait time on each of the conversations to help the business prioritize the conversations that need to happen the quickest to achieve the maximum expected outcome for the business across all of the conversations. In this manner system processing resources and network bandwidth is conserved and allocated in greatest part toward communications with higher possibilities of conversion.

The machine learning system 67 is also used to analyze conversations from secondary entities. For example, the primary entity might be informed by a secondary entity that the primary entity performs above industry averages with regards to conversations having to do with dietary restrictions. By having the machine learning system 67 analyze such a conversation the primary entity is provided with a useful benchmark which enables the primary entity to ensure that individual employees understand dietary restrictions.

By comparing the estimated probability of success of incoming communication-based information with eventual outcomes the primary entity is helped to determine whether a specific employee is over-performing or under-performing in their ability to convert secondary entities into customers when handling conversations. Such insights can be given to the primary user, to that employee's manager, or to the employee himself. Feedback from the machine learning system 67 can be used to provide coaching feedback to individual employees of the primary entity. Ideally such feedback is performed in real time so that a conversing employee receives a real-time understanding of how their conversation is going and the likelihood of converting a customer into a buyer.

Referring once again to FIG. 1, the system 10 supports an artificial intelligence ("AI") bot 43 which automatically operates as an agent on behalf of the primary entity. The bot 43 automatically supplies answers to customer's questions and comments from the entity model 21. Specifically, the bot 43 automatically evaluates possible responses to the questions it receives based on a desired expected result. Thus the bot 43 evaluates possible responses and selects the proper one to achieve the goal of the primary entity.

The bot 43 also automatically funnels incoming communication-based information to proper locales. For example, incoming conversations which have a low probability of rising to a sale (low probability of "conversion") may be immediately handled by the bot 43 itself while conversations identified as having a high probability of rising to a sale (high probability of "conversion") may be automatically transferred to a primary user. Thus the bot 43 operates as an automatic answering service that directs incoming messages to the most beneficial primary user or which handles incoming messages itself, depending on message content.

Refer now to FIG. 9 for a flow chart of a platform update process 400 for routing online conversations that is performed by one or more processors of the entity intelligence engine 12. The process 400 includes receiving a plurality of communications from a plurality of secondary entities during a plurality of electronic communication sessions, wherein the plurality of communications include a plurality of conversions (step 402). A likelihood of conversion model is trained based on the plurality of communications and on the plurality of conversions (step 404). Particular communications are received via a network from a particular secondary entity during a particular communication session (step 406). An artificial response system, for example implementing a bot such as a chat bot, is used to respond to the particular communications (step 408). The particular communications are analyzed to determine a likelihood of conversion based on the conversion model (step 410). The particular communication session is handed off from the artificial response system based on the likelihood of conversion (step 412).

One challenge with using bots is their initial set up and provisioning with information. Setup and provisioning require a determination of the routines that the bot 43 should handle as well as a determination of what knowledge and data the bot 43 needs to perform its assigned tasks. To that end the system 10 includes an appropriate software-based bot template 45. That bot template 45 is beneficially selected from a selection of available bot templates 45 from a bot template supplier. Selection of a bot template 45 can be based in part on information determined by a lookup service, from recommendations by a bot template supplier, from experience, or in another suitable manner.

For purposes of clarity of explanation, the bot template 45 is assumed hereinafter to be that of a business entity having a predetermined size and a specific location. Bot templates 45 are preferably designed to set up and provision a bot 43 to auto-replying to recognized questions and to handle various inputs in predetermined manners. Bot templates 45 may set up bots 43 with menus, optional selections, and free-programmed conversation flows through communication mediums such as texting, voice calls, Facebook Messenger™ or Apple's iMessage™.

Despite its declining importance in the business world the bot template 45 preferably uses old fashion phone numbers as seed information when setting up and provisioning the bot 43. Given a phone number seed the bot template 45 uses the entity intelligence engine 12 to actively seek out additional information for the entity model 21 and for the entity datastore 26 as well as for provisioning the bot 43. To obtain additional information the entity intelligence engine 12 uses the user interface 42 and the telecom carrier interface 32 to perform a phone search via the telecom API 14. The entity intelligence engine 12 can further perform a phone search via one or more of the messaging platform API 16, social network platform API 17, and online services host 19. For example, Yelp™ provides a phone search API that enables partnering developers to search for businesses using phone numbers.

Given a phone number the entity intelligence engine 12 also extracts additional information from other datastores or lookups to populate the bot template 45. For example, a name and/or physical address extracted from Yelp™ enables the entity intelligence engine 12 to contact a lookup service such as Foursquare™ or to search the World Wide Web to find additional information about the primary entity. Information extracted from one datastore is then compared to information extracted from other datastores to identify mistakes and to identify additional information suitable for searching.

Information eventually obtained by the entity intelligence engine 12 from the seed phone number may include the name of the primary entity, its hours of operation, its physical location, information about its business or other categories and ratings and reviews, and other information about the operations and offerings of the primary entity. Such information is made available to the bot template 45 and if appropriate to the entity model 21 via the entity datastore 26.

Other obtained information may include pointers to websites and/or to social media accounts where further information about the primary entity can be found and made available to the bot template 45 and thus to the bot 43. For example, having found an entity's website the system 10 can enable a web crawling service by way of the online services host 19 to crawl the entity's website to extract further information about the primary entity.

Information found by the bot template 45 can include photos, videos, and documents. For example, a lookup service may find a portable document format ("PDF") file or photo of a menu on a website or through another source (such as Yelp™). That menu PDF can be processed by the user interface 42 to extract structured information about the primary entity. For example, a restaurant menu can be processed using optical character recognition (OCR) and natural language processing (NLP) techniques at the user interface 42 to extract the menu's contents. Indeed, such techniques can be used by the system 10 to identify that the PDF is a menu in the first place.

It should be understood that while the bot template 45 automatically seeks information to provision the bot 43, that other information can be made available concurrently or preemptively by the primary user or by another system. For example, a provisioning primary user might provide the name of the primary entity when entering the phone number to the bot template 45. Alternatively, the system 10 may use the user interface 42 to ask the provisioning primary user to supply store hours information or other information. Such is particularly beneficial if the bot provisioning template 45 tried and failed to find that information.

Once properly provisioned, the bot 43 and the underlying entity intelligence engine 12 can run on a central server, on multi-element distributed server, or on a client or endpoint device such as a smartphone. The bot 43 can be hooked up to existing or to new communication channels to begin automatically handling some or all transactions on behalf of the primary entity. For example, the bot 43 can be given access to incoming text messages applied to the telecom carrier interface 32. Then the bot 43 can use the user interface 42 to automatically reply to recognized questions and inputs. As another example, the bot 43 can be hooked up to a web chat interface via the API of the online services host 19. Then the bot 43 can similarly automatically output replies to recognized inputs.

It should be understood that in some applications that it may be desirable to require identifying or authenticating information before giving the bot 43 automated control of the system 10. For example, a user may be required to authenticate with the entity's telecom provider's account system before beginning the bot provisioning process of the bot template 45 or before hooking up the provisioned bot 43 to the system's communication channels.

The bot template 45 (and thus the system 10) can also be implemented to key off of a different identifier than a phone number. For example, a physical address can serve the same purpose. Alternatively, a primary user can select the primary entity from a list of entities (e.g., businesses) presented in a list interface, search interface, or map interface. Yet another implementation is to embed some or all pieces of the bot template 45 in a telecom provider's infrastructure. The system 10 then can be implemented so as to allow automated provisioning of the bot 43 based on a set of phone numbers or other identifiers, rather than one phone number.

As noted above the system 10 applies sentiment analysis via the sentiment analyzer 61 to its communication-based information to determine topics driving positive or negative sentiment. Importantly the system 10 tracks and reports on requests and inquiries that the primary entity declines, says "no" to, or in other ways produces a negative sentiment, since such negative sentiment, when properly analyzed, may present opportunities for the primary entity.

In addition, the system 10 uses its user interface 42 and bot 43 to track compliance or non-compliance with desired policies and practices. For example, the system 10 can be programmed to track compliance with a desired policy such as that every customer should be warmly thanked for their business. Discrepancies in information, tone, response time, or style in responses between different employees, departments, topics, or channels are tracked and analyzed. Of particular importance to tracking and analysis is identifying any changes to any of the above responses over time.

In addition to examining the communication-based information of a primary entity as provided for in the entity model 21, the system 10 also mines insights from comparable secondary entities. This is made possible by programming the system 10 to derive entity models 21 for secondary entities by analyzing communication-based information to and from those secondary entities.

The sentiment analyzer 61 is particularly useful when the system 10 examines secondary entities that are in the same general category (e.g., Indian restaurants or athletic shoe retail) as the primary entity. For example, secondary entities that are most similar to the primary entity may be bellwethers for the primary entity since they might be first to experience trends and changes that are important to the primary entity or that enable another secondary entity to set aspirational targets for the primary entity (e.g., being top rated as determined by awards or online ratings services or highest performing based on financial results). Secondary entities in local geography or which share overlapping customer bases can be particularly useful bellwethers.

The entity intelligence engine 12 uses the insight developed by the sentiment analyzer 61 to compare the communication-based information of the primary entity to those of the comparable secondary entities. Statistically-significant deviations in the output of the sentiment analyzer 61 are reported to the primary user or to other interested party as they will signify that some entities are received more positively than others.

Also of great importance to the system 10 is programming the entity intelligence engine 12 to identify new topics of conversation, to determine where the primary entity's practices differ from those of aspirational competitors (for example, open hours or tone of voice), any trends in communications channels among comparable entities, how comparable entities are handling new trends or topics in the industry, and changes in communication volumes or shifts in peak vs slow times for geographically nearby entities.

The system 10 further tracks with whom primary entities communicate. The entity intelligence engine 12 looks those parties up such as by using "reverse phone number lookup" services that can identify the name of a customer from the phone number. Demographic information and social media information are particularly relevant to the entity intelligence engine 12.

The system 10 further helps the primary entity to understand which customer types the primary entity and secondary entities are communicating with and which may be under-serviced. If a primary entity has multiple types of customers the system 10 helps create a nuanced understanding of the customer breakdowns to provide insight to form different tactics and strategies for communicating effectively with each sub-group. By knowing the type of customers that communicate with a primary entity the system 10 assists its primary entity to find potential customers for possible marketing, or potential customers in underrepresented customer types.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method for routing online conversations comprising:
    receiving a plurality of communications from a plurality of secondary entities during a plurality of electronic communication sessions, wherein the plurality of communications include a plurality of conversions, the plurality of conversions comprising a plurality of sale transactions engaged in by the secondary entities;
    training a likelihood of conversion model based on the plurality of communications and on the plurality of conversions;
    receiving via a network particular communications from a particular secondary entity during a particular communication session;
    using an artificial response system to respond to the particular communications;
    analyzing the particular communications to determine a particular likelihood of conversion based on the likelihood of conversion model, the particular likelihood of conversion comprising a likelihood that the particular secondary entity will engage in a particular sale transaction; and handing off the particular communication session to a particular user from the artificial response system based on the particular likelihood of conversion.

2. The method of claim 1, wherein the plurality of communications comprise textual online chat queries.

3. The method of claim 1, wherein the plurality of conversions include actuations by the plurality of secondary entities of a particular indicator in a user interface during the plurality of electronic communication sessions.

4. The method of claim 1, furthering comprising:
the handing off the particular communication session to the particular user comprising handing off the particular communication session to a user of a primary entity based on the particular likelihood of conversion; and
providing the primary entity with an indication of the particular likelihood of conversion.

5. The method of claim 1, further comprising:
the handing off the particular communication session to the particular user comprising handing off the particular communication session to a user of a primary entity based on the particular likelihood of conversion; and
providing the user of the primary entity with a plurality of indications of change to the particular likelihood of conversion in real time during the particular communication session.

6. The method of claim 1, furthering comprising:
the handing off the particular communication session to the particular user comprising handing off the particular communication session to a user of a primary entity based on the particular likelihood of conversion;
determining a failure to convert the particular sale transaction by the user of the primary entity; and
reporting the particular likelihood of conversion and the failure to convert the particular sale transaction by the user of the primary entity.

7. The method of claim 1, furthering comprising:
the handing off the particular communication session to the particular user comprising handing off the particular communication session to a user of a primary entity based on the particular likelihood of conversion;
monitoring responses of the user of the primary entity to the particular communications during the particular communication session; and
training the likelihood of conversion model further based on the particular communications and the responses of the user of the primary entity to the particular communications.

8. The method of claim 1, furthering comprising:
the handing off the particular communication session to the particular user comprising handing off the particular communication session to a user of a primary entity based on the particular likelihood of conversion;
providing the user of the primary entity a plurality of suggested responses to the particular communications;
accepting selection from the user of the primary entity of at least one of the plurality of suggested responses; and
enabling transmission of the at least one of the plurality of suggested responses to the particular secondary entity during the particular communication session.

9. The method of claim 1, further comprising:
receiving via the network other communications from an other secondary entity during an other communication session;
using the artificial response system to respond to the other communications;
analyzing the other communications to determine an other likelihood of conversion based on the likelihood of conversion model, the other likelihood of conversion comprising a likelihood that the other secondary entity will engage in an other sale transaction;
comparing the particular likelihood of conversion and the other likelihood of conversion;
handing off the particular communication session from the artificial response system further based on the comparing of the particular likelihood of conversion and the other likelihood of conversion.

10. The method of claim 9, wherein:
the determining the particular likelihood of conversion comprises determining a particular score;
the determining the other likelihood of conversion comprises determining an other score; and
the comparing the particular likelihood of conversion and the other likelihood of conversion comprises comparing the particular score and the other score.

11. The method of claim 1, wherein the plurality of electronic communication sessions include a plurality of wait times prior to a plurality of hand offs, the method further comprising:
training the likelihood of conversion model further based on the plurality of wait times prior to the plurality of hand offs;
receiving time duration information of the particular communication session; and
analyzing the particular communications and the time duration information to determine the particular likelihood of conversion based on the likelihood of conversion model.

12. The method of claim 1, further comprising receiving the plurality of communications via an application program interface ("API") enabled by a processor-enabled computing system of at least one of a telecommunication carrier, a messaging platform, a social networking platform, or an online services host.

13. The method of claim 1, further comprising:
querying a primary entity regarding success of the plurality of electronic communication sessions;
receiving from the primary entity a plurality of indications of success of the plurality of electronic communication sessions in response to the querying;
identifying the plurality of conversions based on the plurality of indications of success, whereby training the likelihood of conversion model based on the plurality of communications and on the plurality of conversions comprises training the likelihood of conversion model based on the plurality of indications of success;
the handing off the particular communication session to the particular user comprising handing off the particular communication session to a user of the primary entity based on the particular likelihood of conversion; and
providing the primary entity with an indication of the particular likelihood of conversion.

14. A method for routing online conversations comprising:
receiving a plurality of communications from a plurality of entities during a plurality of electronic communication sessions and receiving a plurality of conversions of the plurality of communications, the plurality of conversions comprising a plurality of sale transactions engaged in by the plurality of entities;

training a model based on the plurality of communications and on the plurality of conversions;
receiving via a network at least a first communication from a first entity during a first communication session;
receiving via the network at least a second communication from a second entity during a second communication session;
analyzing the at least the first communication to determine a first likelihood of conversion based on the model, the first likelihood of conversion comprising a likelihood that the first entity will engage in a first sale transaction;
analyzing the at least the second communication to determine a second likelihood of conversion based on the model, the second likelihood of conversion comprising a likelihood that the second entity will engage in a second sale transaction;
based on the first likelihood of conversion, handing off the first communication session to a particular user for responding in the first communication session; and
based on the second likelihood of conversion, responding in the second communication session using an artificial response system.

15. The method of claim 14, further comprising:
using the artificial response system to receive the at least the first communication from the first entity during the first communication session and to receive the at least the second communication from the second entity during the second communication session; and
handing off the first communication session from the artificial response system to the particular user for responding in the first communication session.

16. The method of claim 14, further comprising:
comparing the first likelihood of conversion and the second likelihood of conversion; and
handing off the first communication session further based on the comparing of the first likelihood of conversion and the second likelihood of conversion.

17. The method of claim 16, further comprising handing off the first communication session further based on the first likelihood of conversion being greater than the second likelihood of conversion.

18. The method of claim 16, further comprising:
receiving a plurality of failure of conversions of the plurality of communications; and
training the model further based on the plurality of failure of conversions.

19. The method of claim 16, further wherein:
the plurality of conversions comprise actuations by the plurality of entities of a particular indicator in a plurality of user interfaces during the plurality of electronic communication sessions;
the first likelihood of conversion comprises a likelihood that the first entity will actuate the particular indicator via a first user interface via a first user device during the first communication session; and
the second likelihood of conversion comprises a likelihood that the second entity will actuate the particular indicator via a second user interface via a second user device during the second communication session.

20. The method of claim 14, further comprising:
querying the plurality of entities regarding success of the plurality of electronic communication sessions;
receiving from the plurality of entities a plurality of indications of success of the plurality of electronic communication sessions in response to the querying; and
identifying the plurality of conversions based on the plurality of indications of success, wherein receiving the plurality of conversions of the plurality of communications comprises receiving the plurality of indications of success.

21. The method of claim 20, further comprising:
receiving from the plurality of entities a plurality of indications of failure of the plurality of electronic communication sessions in response to the querying; and
training the model further based on the plurality of indications of failure.

22. A network-enabled device control system comprising at least one processor and at least one non-transitory computer readable storage medium having encoded thereon instructions that when executed by the at least one processor cause the network-enabled device control system to perform a process comprising:
receiving a plurality of communications from a plurality of entities during a plurality of electronic communication sessions and a plurality of conversions of the plurality of communications, the plurality of conversions comprising a plurality of sale transactions engaged in by the plurality of entities;
training a model based on the plurality of communications and on the plurality of conversions;
receiving via an artificial response system via a network at least a first communication from a first entity during a first communication session;
receiving via the artificial response system via the network at least a second communication from a second entity during a second communication session;
analyzing the at least the first communication to determine a first likelihood of conversion based on the model, the first likelihood of conversion comprising a likelihood that the first entity will engage in a first sale transaction;
analyzing the at least the second communication to determine a second likelihood of conversion based on the model, the second likelihood of conversion comprising a likelihood that the second entity will engage in a second sale transaction;
based on the first likelihood of conversion, handing off the first communication session to a user for responding in the first communication session; and
based on the second likelihood of conversion, responding in the second communication session using the artificial response system.

23. The network-enabled device control system of claim 22, the at least one non-transitory computer readable storage medium further having encoded thereon the instructions that when executed by the at least one processor cause the network-enabled device control system to perform the process further comprising:
providing the user a plurality of suggested responses to the at least the first communication;
accepting selection from the user of at least one of the plurality of suggested responses to the at least the first communication; and
enabling transmission to the first entity of the at least one of the plurality of suggested responses to the at least the first communication during the first communication session.

* * * * *